(12) United States Patent
Cho et al.

(10) Patent No.: US 10,030,742 B2
(45) Date of Patent: Jul. 24, 2018

(54) PLANETARY GEAR TRAIN OF AUTOMATIC TRANSMISSION FOR VEHICLES

(71) Applicant: Hyundai Motor Company, Seoul (KR)

(72) Inventors: Wonmin Cho, Hwaseong-si (KR); Seong Wook Hwang, Gunpo-si (KR); Hyun Sik Kwon, Seoul (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 52 days.

(21) Appl. No.: 15/265,795

(22) Filed: Sep. 14, 2016

(65) Prior Publication Data

US 2017/0284512 A1 Oct. 5, 2017

(30) Foreign Application Priority Data

Mar. 30, 2016 (KR) .......... 10-2016-0038472

(51) Int. Cl.
*F16H 3/66* (2006.01)

(52) U.S. Cl.
CPC ....... *F16H 3/66* (2013.01); *F16H 2200/0073* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS 8,343,007 B2 1/2013 Hart et al.

FOREIGN PATENT DOCUMENTS

| JP | 2015-224756 A | 12/2015 |
|---|---|---|
| KR | 10-2014-0046240 A | 4/2014 |
| KR | 10-1427977 B1 | 8/2014 |

*Primary Examiner* — Jacob S. Scott
(74) *Attorney, Agent, or Firm* — Morgan, Lewis & Bockius LLP (57) ABSTRACT

A planetary gear train of an automatic transmission for a vehicle may include an input shaft receiving torque of an engine, an output shaft outputting torque, a first planetary gear set, a second planetary gear set, a third planetary gear set, a fourth planetary gear set, a first shaft directly connected with the input shaft, a second shaft, a third shaft, a fourth shaft, a fifth shaft selectively connectable with each of the first shaft and the second shaft, a sixth shaft selectively connectable with the third shaft, and directly connected with the output shaft, and a seventh shaft selectively connectable with the second shaft.

14 Claims, 4 Drawing Sheets

| Speed Stage | Control element ||||| Gear Ratio |
|---|---|---|---|---|---|---|
| | C1 | C2 | C3 | C4 | C5 | B1 | |
| D1 | | | ● | ● | | ● | 4.833 |
| D2 | ● | ● | | ● | | ● | 3.340 |
| D3 | ● | | | ● | | ● | 2.500 |
| D4 | ● | | | | ● | ● | 1.944 |
| D5 | ● | ● | | | | ● | 1.600 |
| D6 | ● | ● | | | ● | | 1.235 |
| D7 | ● | | ● | | | | 1.000 |
| D8 | | ● | ● | | ● | | 0.972 |
| D9 | | | ● | ● | ● | | 0.829 |
| D10 | | ● | ● | ● | ● | | 0.681 |
| D11 | | ● | ● | ● | ● | | 0.557 |
| REV | | ● | ● | | | ● | 2.900 |

| Speed Stage | Control element | | | | | | Gear Ratio |
|---|---|---|---|---|---|---|---|
| | C1 | C2 | C3 | C4 | B1 | B2 | |
| D1 | | | ● | ● | ● | | 5.688 |
| D2 | | ● | | ● | ● | | 3.769 |
| D3 | ● | | | ● | ● | | 2.600 |
| D4 | ● | | | | ● | ● | 1.981 |
| D5 | ● | ● | | | ● | | 1.615 |
| D6 | ● | ● | ● | | | ● | 1.243 |
| D7 | ● | ● | ● | | | | 1.000 |
| D8 | | | ● | | | ● | 0.974 |
| D9 | | ● | ● | | | ● | 0.813 |
| D10 | | | ● | ● | | ● | 0.678 |
| D11 | | ● | ● | ● | | ● | 0.575 |
| REV | | | | | ● | | 3.500 |

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2016-0038472, filed Mar. 30, 2016, the entire contents of which is incorporated herein for all purposes by this reference.

BACKGROUND OF THE INVENTION

Field of the Invention

The present invention relates to an automatic transmission for a vehicle. More particularly, to a planetary gear train of an automatic transmission for a vehicle that improves power delivery performance and fuel economy by achieving at least eleven forward speed stages with a minimum number of constituent elements being used, and improves driving stability of a vehicle by utilizing a low rotation speed of an engine.

Description of Related Art

In the field of an automatic transmission, multiplicity of shift-stages is a useful technology for enhancement of fuel consumption and drivability of a vehicle. Recent increases in oil prices are triggering stiff competition in enhancing fuel consumption of a vehicle.

In this sense, research on an engine has been undertaken to achieve weight reduction and to enhance fuel consumption by so-called downsizing, and research on an automatic transmission has been performed to simultaneously provide better drivability and fuel consumption by achieving more shift stages.

In order to achieve more shift stages for an automatic transmission, the number of parts, especially the number of planetary gear sets, is typically increased, which may deteriorate installability, production cost, weight and/or power flow efficiency.

Therefore, development of a planetary gear train capable of achieving maximum efficiency by minimum number of parts is substantially beneficial for maximizing improvement of fuel consumption by multiple shift-stages of an automatic transmission.

In this respect, an eight-speed automatic transmission has been recently introduced, and a planetary gear train for an automatic transmission enabling more shift stages is under investigation.

An automatic transmission of eight or more shift-stages typically includes three to four planetary gear sets and five to six control elements (frictional elements), and may easily become lengthy, thereby deteriorating installability.

In this regard, disposing planetary gear sets in parallel or employing dog clutches instead of wet-type control elements has been attempted. However, such an arrangement is not widely applicable, and using dog clutches may easily deteriorate shift-feel.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving eleven forward speed stages and one reverse speed stage using a minimum number of constituent elements, and improving silent driving using a driving point positioned at a low engine speed.

According to various aspects of the present invention, a planetary gear train of an automatic transmission for a vehicle may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, a fourth planetary gear set including tenth, eleventh, and twelfth rotation elements, a first shaft connecting the first rotation element and the fifth rotation element and directly connected with the input shaft, a second shaft connected with the second rotation element, a third shaft connecting the third rotation element and ninth rotation element, a fourth shaft connected with the fourth rotation element, a fifth shaft connected with the eighth rotation element and selectively connectable with each of the first shaft and the second shaft, a sixth shaft connected with the eleventh rotation element, selectively connectable with the third shaft, and directly connected with the output shaft, and a seventh shaft connected with the twelfth rotation element and selectively connectable with the second shaft.

The first, second, and third rotation elements may be first sun gear, a first planet carrier, and a first ring gear, the fourth, fifth, and sixth rotation elements may be a second sun gear, a second planet carrier, and a second ring gear, the seventh, eighth, and ninth rotation elements may be a third sun gear, a third planet carrier, and a third ring gear, and the tenth, eleventh, and twelfth rotation elements may be a fourth sun gear, a fourth planet carrier, and a fourth ring gear.

The fourth shaft may be directly connected with a transmission housing, the seventh shaft may be selectively connectable with the transmission housing, and the planetary gear train may further include an eighth shaft connected with the sixth rotation element, and a ninth shaft connecting the seventh rotation element and the tenth rotation element and selectively connectable with the eighth shaft.

The planetary gear train may further include a first clutch selectively connecting the first shaft and fifth shaft, a second clutch selectively connecting the third shaft and the sixth shaft, a third clutch selectively connecting the second shaft and the seventh shaft, a fourth clutch selectively connecting the second shaft and the fifth shaft, a fifth clutch selectively connecting the eighth shaft and the ninth shaft, and a first brake selectively connecting the seventh shaft and the transmission housing.

The fourth shaft and the seventh shaft may each be selectively connectable with the transmission housing, and the planetary gear train may further include an eighth shaft connecting the sixth rotation element, the seventh rotation element, and the tenth rotation element.

The planetary gear train may further include a first clutch selectively connecting the first shaft and fifth shaft, a second clutch selectively connecting the third shaft and the sixth shaft, a third clutch selectively connecting the second shaft and the seventh shaft, a fourth clutch selectively connecting the second shaft and the fifth shaft, a first brake selectively connecting the seventh shaft and a transmission housing, and a second brake selectively connecting the fourth shaft and the transmission housing.

According to various aspects of the present invention, a planetary gear train of an automatic transmission for a vehicle may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected with the fifth rotation element, the output shaft may be directly connected with the eleventh rotation element, the first rotation element may be directly connected with the fifth rotation element, the third rotation element may be directly connected with the ninth rotation element, the fourth rotation element may be directly connected with a transmission housing, the seventh rotation element may be directly connected with the tenth rotation element and selectively connectable with the sixth rotation element, the eighth rotation element may be selectively connectable with each of the second rotation element and the fifth rotation element, the eleventh rotation element may be selectively connectable with the ninth rotation element, and the twelfth rotation element may be selectively connectable with the second rotation element.

The twelfth rotation element may be selectively connectable with the transmission housing.

The planetary gear train may further include a first clutch selectively connecting the fifth rotation element and the eighth rotation element, a second clutch selectively connecting the ninth rotation element and the eleventh rotation element, a third clutch selectively connecting the second rotation element and the twelfth rotation element, a fourth clutch selectively connecting the second rotation element and the eighth rotation element, a fifth clutch selectively connecting the sixth rotation element and the seventh rotation element, and a first brake selectively connecting the twelfth rotation element and the transmission housing.

According to various aspects of the present invention, a planetary gear train of an automatic transmission for a vehicle may include an input shaft receiving torque of an engine, an output shaft outputting torque, a first planetary gear set including first, second, and third rotation elements, a second planetary gear set including fourth, fifth, and sixth rotation elements, a third planetary gear set including seventh, eighth, and ninth rotation elements, and a fourth planetary gear set including tenth, eleventh, and twelfth rotation elements, in which the input shaft may be directly connected with the fifth rotation element, the output shaft may be directly connected with the eleventh rotation element, the first rotation element may be directly connected with the fifth rotation element, the third rotation element may be directly connected with the ninth rotation element, the sixth rotation element may be directly connected with the seventh rotation element and the tenth rotation element, the eighth rotation element may be selectively connectable with each of the second rotation element and the fifth rotation element, the eleventh rotation element may be selectively connectable with the ninth rotation element, and the twelfth rotation element may be selectively connectable with the second rotation element.

The fourth rotation element and the twelfth rotation element may each be selectively connectable with a transmission housing.

The planetary gear train may further include a first clutch selectively connecting the fifth rotation element and the eighth rotation element, a second clutch selectively connecting the ninth rotation element and the eleventh rotation element, a third clutch selectively connecting the second rotation element and the twelfth rotation element, a fourth clutch selectively connecting the second rotation element and the eighth rotation element, a first brake selectively connecting the twelfth rotation element and the transmission housing, and a second brake selectively connecting the fourth rotation element and the transmission housing.

Various embodiments of the present invention achieve at least eleven forward speed stages and one reverse speed stage by combining four planetary gear sets with six control elements.

Various embodiments of the present invention achieve at least eleven forward speed stages and one reverse speed stage by combining four planetary gear sets with seven control elements.

In addition, a planetary gear train according to various embodiments of the present invention maximizes engine driving efficiency by multiple speed-stages of an automatic transmission, and improves power delivery performance and fuel consumption.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
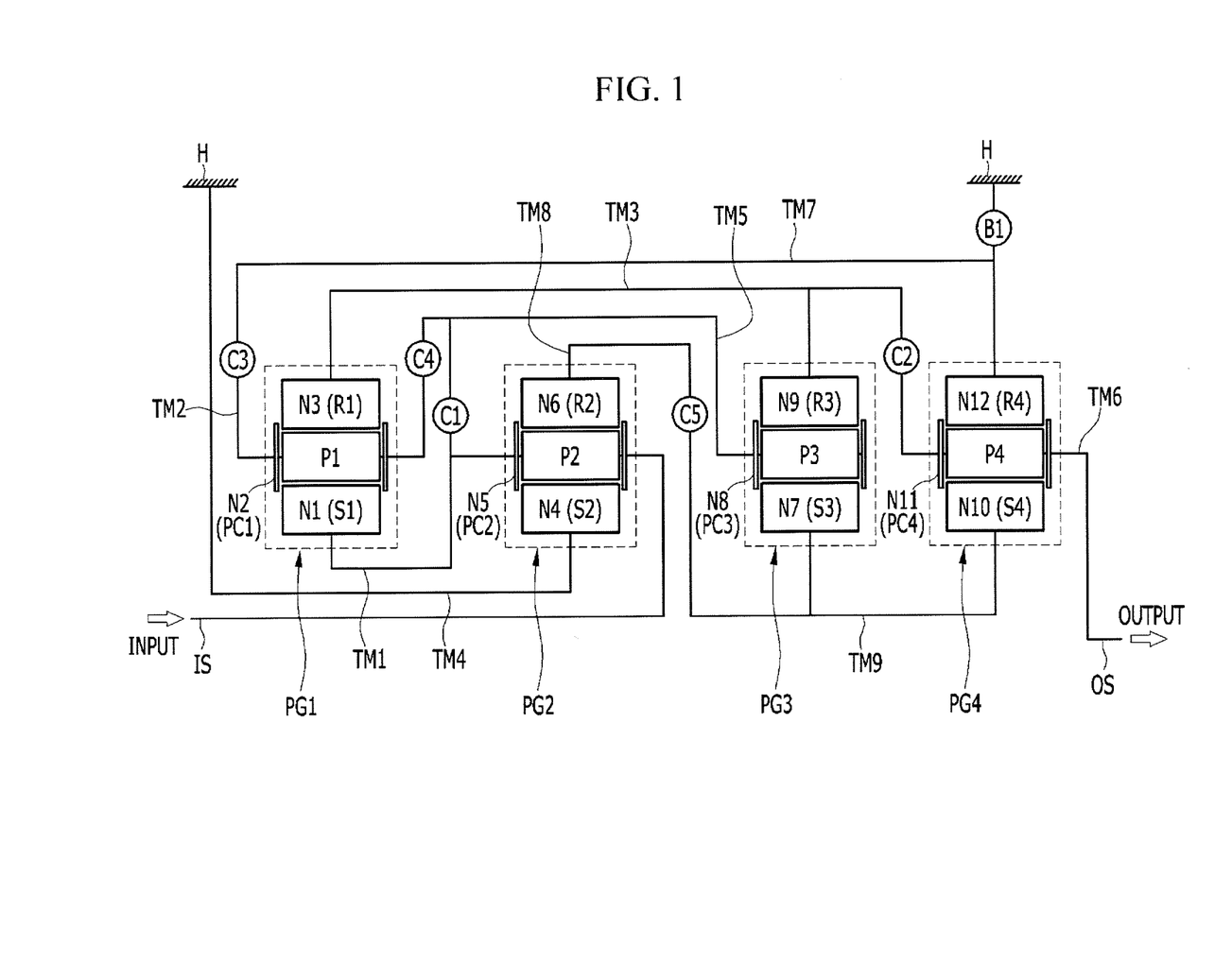
FIG. 1 is a schematic diagram of a planetary gear train according to various embodiments of the present invention.

FIG. 1 is a schematic diagram of a planetary gear train according to a first exemplary embodiment of the present invention.

Referring to FIG. 1, a planetary gear train according to the first exemplary embodiment of the present invention includes first, second, third, and four planetary gear sets PG1, PG2, PG3, and PG4 arranged on a same axis, an input shaft IS, an output shaft OS, nine shafts TM1 to TM9 interconnecting rotation elements of the first, second, third, and four planetary gear sets PG1, PG2, PG3, and PG4, five clutches C1 to C5 and one brake B1 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

In the first, second, third, and fourth planetary gear sets PG1, PG2, PG3, and PG4, the first rotation element N1 is directly connected to the fifth rotation element N5, the third rotation element N3 is directly connected to the ninth rotation element N9, and the seventh rotation element N7 is directly connected to the tenth rotation element N10, such that the first, second, third, and fourth planetary gear sets PG1, PG2, PG3, and PG4 are operated while having a total of nine shafts TM1 to TM9.

The nine shafts TM1 to TM9 will be described in further detail.

The nine shafts TM1 to TM9 directly connect a plurality of rotation elements among the rotation elements of the planetary gear sets PG1, PG2, PG3, and PG4, are rotation members that are each directly connected to at least one rotation element of the planetary gear sets PG1, PG2, PG3, and PG4 and rotate with the at least one rotation element to transmit torque, or are fixed members that directly connect at least one rotation element of the planetary gear sets PG1, PG2, PG3, and PG4 to the transmission housing H to fix the at least one rotation element.

The first shaft TM1 directly connects the first rotation element N1 (first sun gear S1) and the fifth rotation element N5 (second planet carrier PC2) and is directly connected with the input shaft IS so as to continuously be operated as an input element.

The second shaft TM2 is connected with the second rotation element N2 (first planet carrier PC1).

The third shaft TM3 directly connects the third rotation element N3 (first ring gear R1 and the ninth rotation element N9 (third ring gear R3).

The fourth shaft TM4 is connected with the fourth rotation element N4 (second sun gear S2) and directly connected with the transmission housing H, thereby continuously acting as a fixed element.

The fifth shaft TM5 is connected with the eighth rotation element N8 (third planet carrier PC3), and selectively connectable with the first shaft TM1 and the second shaft TM2 respectively.

The sixth shaft TM6 is connected with the eleventh rotation element N11 (fourth planet carrier PC4), selectively connectable with the third shaft TM3, and directly connected with the output shaft OS so as to be continuously operated as an output element.

The seventh shaft TM7 is connected with the twelfth rotation element N12 (fourth ring gear R4), selectively connectable with the second shaft TM2, and selectively connectable with the transmission housing H, thereby selectively acting as a fixed element.

The eighth shaft TM8 is connected with the sixth rotation element N6 (second ring gear R2).

The ninth shaft TM9 directly connects the seventh rotation element N7 (third sun gear S3) and the tenth rotation element N10 (fourth sun gear S4), and is selectively connectable with the eighth shaft TM8.

In addition, five clutches C1, C2, C3, C4, and C5 are disposed at portions at which at least two shafts among the nine shafts TM1 to TM9 including the input shaft IS and the output shaft OS are selectively connectable to each other.

In addition, one brake B1 is disposed at positions at which at least one shaft among the nine shafts TM1 to TM9 is selectively connectable to the transmission housing H.

Arrangements of the five clutches C1 to C5 and the one brake B1 are described in detail.

The first clutch C1 is disposed between the first shaft TM1 and the fifth shaft TM5 and selectively connects the first shaft TM1 and the fifth shaft TM5.

The second clutch C2 is disposed between the third shaft TM3 and the sixth shaft TM6 and selectively connects the third shaft TM3 and the sixth shaft TM6.

The third clutch C3 is disposed between the second shaft TM2 and the seventh shaft TM7 and selectively connects the second shaft TM2 and the seventh shaft TM7.

The fourth clutch C4 is disposed between the second shaft TM2 and the fifth shaft TM5 and selectively connects the second shaft TM2 and the fifth shaft TM5.

The fifth clutch C5 is disposed between the eighth shaft TM8 and the ninth shaft TM9 and selectively connects the eighth shaft TM8 and the ninth shaft TM9.

The first brake B1 is disposed between the seventh shaft TM7 and the transmission housing H and selectively connects the seventh shaft TM7 with the transmission housing H.

Referring to FIG. 1, although the first clutch C1 is selectively connects the first shaft TM1 and the fifth shaft TM5, the first shaft TM1 is continuously directly connected with the input shaft IS such that the first clutch C1 connects the input shaft IS and the fifth shaft TM5, and the fifth shaft TM5 is operated as input element.

The control elements including the first, second, third, fourth, and fifth clutches C1, C2, C3, C4, and C5 and the first brake B1 may be multi-plates friction elements of wet type that are operated by hydraulic pressure.

Figure 2:
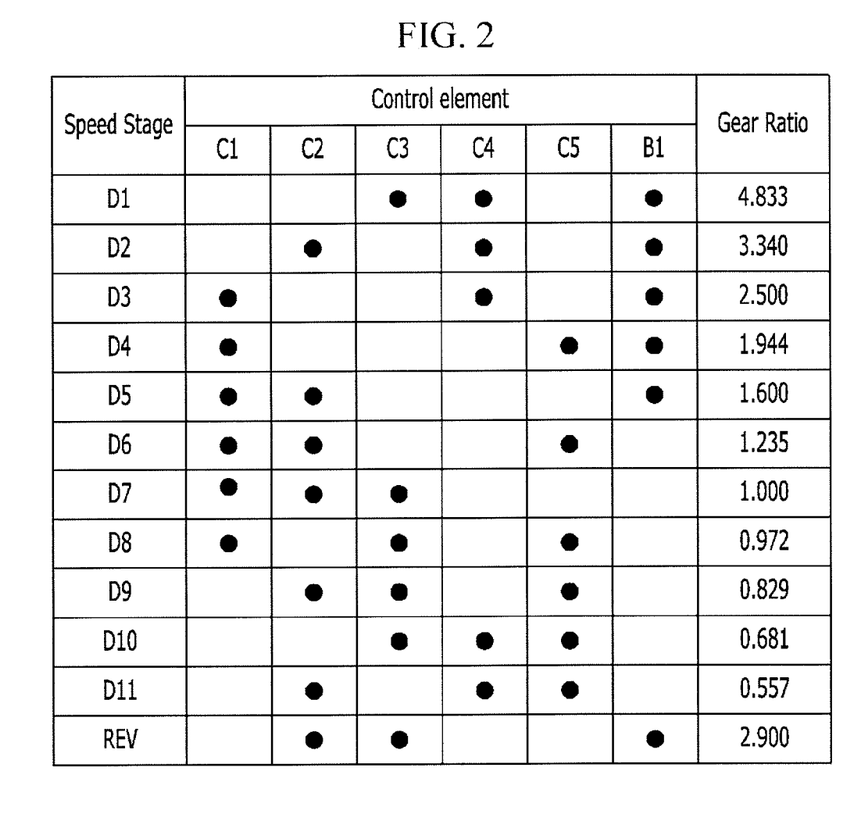
FIG. 2 is an operational chart for respective friction elements at respective shift-stages in the planetary gear train according to various embodiments of the present invention.

FIG. 2 is an operational chart for respective friction elements at respective shift-stages in a planetary gear train according to the first exemplary embodiment of the present invention.

Referring to FIG. 2, three control elements among the first, second, third, fourth, and fifth clutches C1, C2, C3, C4, and C5 and the first brakes B1 that are control elements are operated at each speed stage in the planetary gear train according to the first exemplary embodiment of the present invention. The first exemplary embodiment of the present invention can achieve one reverse speed stage and eleven forward speed stages.

The third and fourth clutches C3 and C4 and first brake B1 are operated at a first forward speed stage D1.

In a state that the second shaft TM2 is connected to the seventh shaft TM7 by the operation of the third clutch C3 and the second shaft TM2 is connected to the fifth shaft TM5 by the operation of the fourth clutch C4, torque of the input shaft IS is input to the first shaft TM1. In addition, the fourth shaft TM4 is continuously operated as the fixed element and the seventh shaft TM7 is operated as the fixed elements by the operation of the first brake B1. Therefore, the torque of the input shaft IS is shifted into the first forward speed stage, and the first forward speed stage is output to the output shaft OS connected to the sixth shaft TM6.

The second and fourth clutches C2 and C4 and first brake B1 are operated at a second forward speed stage D2.

In a state that the third shaft TM3 is connected to the sixth shaft TM6 by the operation of the second clutch C2 and the second shaft TM2 is connected to the fifth shaft TM5 by the operation of the fourth clutch C4, the torque of the input shaft IS is input to the first shaft TM1. In addition, the fourth shaft TM4 is continuously operated as the fixed element and the seventh shaft TM7 is operated as the fixed elements by the operation of the first brake B1. Therefore, the torque of the input shaft IS is shifted into the second forward speed stage, and the second forward speed stage is output to the output shaft OS connected to the sixth shaft TM6.

The first and fourth clutches C1 and C4 and first brake B1 are operated at a third forward speed stage D3.

In a state that the first shaft TM1 is connected to the fifth shaft TM5 by the operation of the first clutch C1 and the second shaft TM2 is connected to the fifth shaft TM5 by the operation of the fourth clutch C4, the torque of the input shaft IS is input to the first shaft TM1 and the fifth shaft TM5. In addition, the fourth shaft TM4 is continuously operated as the fixed element and the seventh shaft TM7 is operated as the fixed elements by the operation of the first brake B1. Therefore, the torque of the input shaft IS is shifted into the third forward speed stage, and the third forward speed stage is output to the output shaft OS connected to the sixth shaft TM6.

The first and fifth clutches C1 and C5 and first brake B1 are operated at a fourth forward speed stage D4.

In a state that the first shaft TM1 is connected to the fifth shaft TM5 by the operation of the first clutch C1 and the eighth shaft TM8 is connected to the ninth shaft TM9 by the operation of the fifth clutch C5, the torque of the input shaft IS is input to the first shaft TM1 and the fifth shaft TM5. In addition, the fourth shaft TM4 is continuously operated as the fixed element and the seventh shaft TM7 is operated as the fixed elements by the operation of the first brake B1. Therefore, the torque of the input shaft IS is shifted into the fourth forward speed stage, and the fourth forward speed stage is output to the output shaft OS connected to the sixth shaft TM6.

The first and second clutches C1 and C2 and first brake B1 are operated at a fifth forward speed stage D5.

In a state that the first shaft TM1 is connected to the fifth shaft TM5 by the operation of the first clutch C1 and the third shaft TM3 is connected to the sixth shaft TM6 by the operation of the second clutch C2, the torque of the input shaft IS is input to the first shaft TM1 and the fifth shaft TM5. In addition, the fourth shaft TM4 is continuously operated as the fixed element and the seventh shaft TM7 is operated as the fixed elements by the operation of the first brake B1. Therefore, the torque of the input shaft IS is shifted into the fifth forward speed stage, and the fifth forward speed stage is output to the output shaft OS connected to the sixth shaft TM6.

The first, second, and fifth clutches C1, C2, and C5 are operated at a sixth forward speed stage D6.

In a state that the first shaft TM1 is connected to the fifth shaft TM5 by the operation of the first clutch C1, the third shaft TM3 is connected to the sixth shaft TM6 by the operation of the second clutch C2, and the eighth shaft TM8 is connected to the ninth shaft TM9 by the operation of the fifth clutch C5, the torque of the input shaft IS is input to the first shaft TM1 and the fifth shaft TM5. In addition, the fourth shaft TM4 is continuously operated as the fixed element and the seventh shaft TM7 is operated as the fixed elements by the operation of the first brake B1. Therefore, the torque of the input shaft IS is shifted into the sixth forward speed stage, and the sixth forward speed stage is output to the output shaft OS connected to the sixth shaft TM6.

The first, second, and third clutches C1, C2, and C3 are operated at a seventh forward speed stage D7.

In a state that the first shaft TM1 is connected to the fifth shaft TM5 by the operation of the first clutch C1, the third shaft TM3 is connected to the sixth shaft TM6 by the operation of the second clutch C2, and the second shaft TM2 is connected to the seventh shaft TM7 by the operation of the third clutch C3, entire planetary gear sets PG1, PG2, PG3, and PG4 integrally rotate. In addition, the fourth shaft TM4 is continuously operated as the fixed element, and a torque inputted through the first shaft TM1 and fifth shaft TM5 is outputted as inputted, thereby forming the seventh forward speed and outputting the inputted torque to the output shaft OS connected with the sixth shaft TM6.

The first, third, and fifth clutches C1, C3, and C5 are operated at an eighth forward speed stage D8.

In a state that the first shaft TM1 is connected to the fifth shaft TM5 by the operation of the first clutch C1, the second shaft TM2 is connected to the seventh shaft TM7 by the operation of the third clutch C3, and the eighth shaft TM8 is connected to the ninth shaft TM9 by the operation of the fifth clutch C5, the torque of the input shaft IS is input to the first shaft TM1 and the fifth shaft TM5. In addition, the fourth shaft TM4 is continuously operated as the fixed element. Therefore, the torque of the input shaft IS is shifted into the eighth forward speed stage, and the eighth forward speed stage is output to the output shaft OS connected to the sixth shaft TM6.

The second, third, and fifth clutches C2, C3, and C5 are operated at a ninth forward speed stage D9.

In a state that the third shaft TM3 is connected to the sixth shaft TM6 by the operation of the second clutch C2, the second shaft TM2 is connected to the seventh shaft TM7 by the operation of the third clutch C3, and the eighth shaft TM8 is connected to the ninth shaft TM9 by the operation of the fifth clutch C5, the torque of the input shaft IS is input to the first shaft TM1. In addition, the fourth shaft TM4 is continuously operated as the fixed element. Therefore, the torque of the input shaft IS is shifted into the ninth forward speed stage, and the ninth forward speed stage is output to the output shaft OS connected to the sixth shaft TM6.

The third, fourth, and fifth clutches C3, C4, and C5 are operated at a tenth forward speed stage D10.

In a state that the second shaft TM2 is connected to the seventh shaft TM7 by the operation of the third clutch C3, the second shaft TM2 is connected to the fifth shaft TM5 by the operation of the fourth clutch C4, and the eighth shaft TM8 is connected to the ninth shaft TM9 by the operation of the fifth clutch C5, the torque of the input shaft IS is input to the first shaft TM1. In addition, the fourth shaft TM4 is continuously operated as the fixed element. Therefore, the torque of the input shaft IS is shifted into the tenth forward speed stage, and the tenth forward speed stage is output to the output shaft OS connected to the sixth shaft TM6.

The second, fourth, and fifth clutches C2, C4, and C5 are operated at an eleven forward speed stage D11.

In a state that the third shaft TM3 is connected to the sixth shaft TM6 by the operation of the second clutch C2, the second shaft TM2 is connected to the fifth shaft TM5 by the operation of the fourth clutch C4, and the eighth shaft TM8 is connected to the ninth shaft TM9 by the operation of the fifth clutch C5, the torque of the input shaft IS is input to the first shaft TM1. In addition, the fourth shaft TM4 is continuously operated as the fixed element. Therefore, the torque of the input shaft IS is shifted into the eleven forward speed stage, and the eleven forward speed stage is output to the output shaft OS connected to the sixth shaft TM6.

The second and third clutches C2 and C3 and first brake B1 are operated at a reverse speed stage REV.

In a state that the third shaft TM3 is connected to the sixth shaft TM6 by the operation of the second clutch C2 and the second shaft TM2 is connected to the seventh shaft TM7 by the operation of the third clutch C3, the torque of the input shaft IS is input to the first shaft TM1. In addition, the fourth shaft TM4 is continuously operated as the fixed element and the seventh shaft TM7 is operated as the fixed elements by the operation of the first brake B1. Therefore, the torque of the input shaft IS is shifted into the reverse speed stage, and the reverse speed stage is output to the output shaft OS connected to the sixth shaft TM6.

Figure 3:
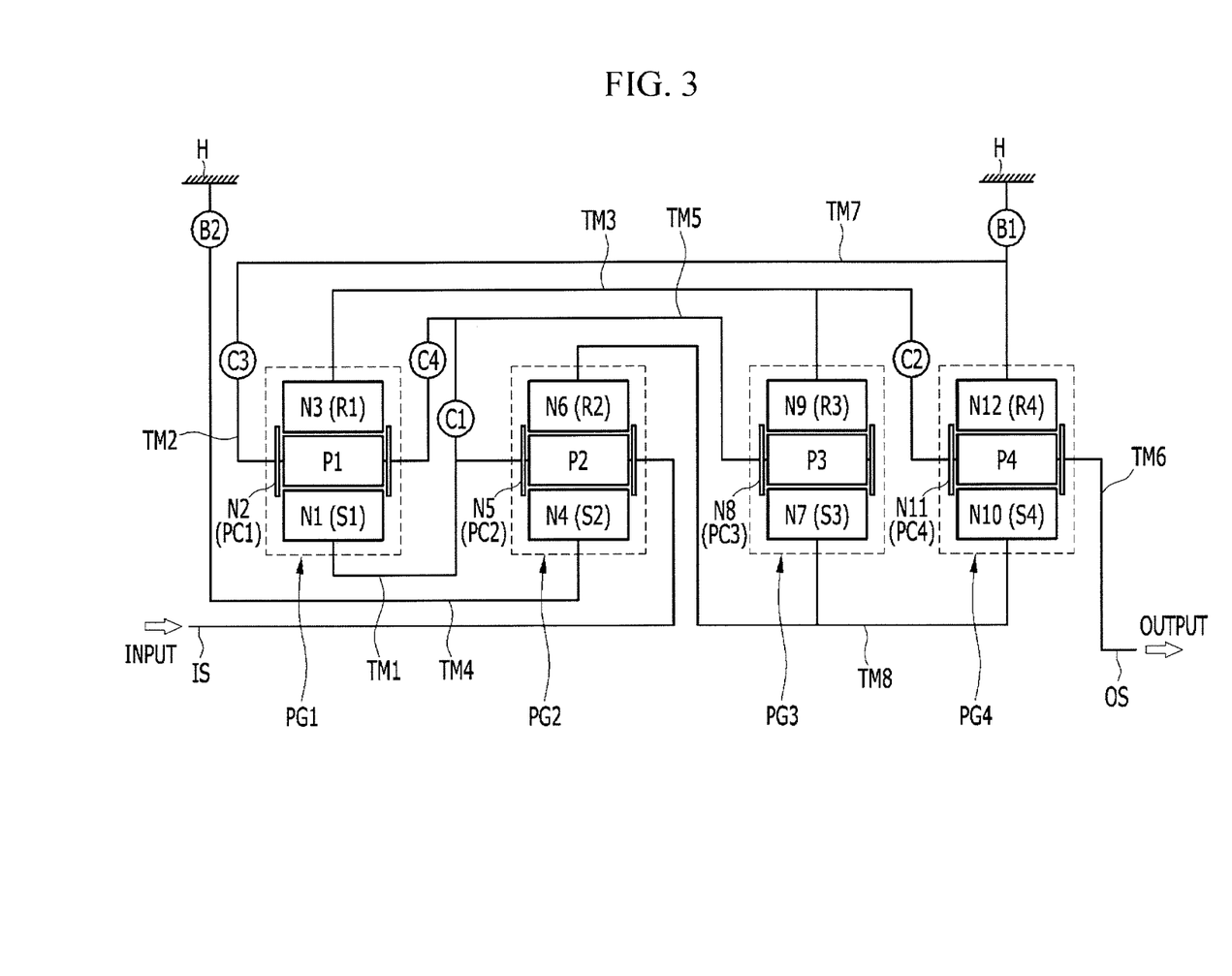
FIG. 3 is a schematic diagram of a planetary gear train according to various embodiments of the present invention.

FIG. 3 is a schematic diagram of a planetary gear train according to a second exemplary embodiment of the present invention.

Referring to FIG. 3, a planetary gear train according to the second exemplary embodiment of the present invention includes first, second, third, and four planetary gear sets PG1, PG2, PG3, and PG4 arranged on a same axis, an input shaft IS, an output shaft OS, eight shafts TM1 to TM8 interconnecting rotation elements of the first, second, third, and four planetary gear sets PG1, PG2, PG3, and PG4, four clutches C1 to C4 and two brakes B1 to B2 as control elements, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member and the torque from a crankshaft of an engine is input into the input shaft IS, after being torque-converted through a torque converter.

The output shaft OS is an output member, is disposed in parallel with the input shaft IS, and transmits driving torque to a driving wheel through a differential apparatus.

The first planetary gear set PG1 is a single pinion planetary gear set and includes a first sun gear S1, a first planet carrier PC1 rotatably supporting a first pinion P1 that is externally meshed with the first sun gear S1, and a first ring gear R1 that is internally meshed with the first pinion P1 respectively as first, second, and third rotation elements N1, N2, and N3.

The second planetary gear set PG2 is a single pinion planetary gear set and includes a second sun gear S2, a second planet carrier PC2 rotatably supporting a second pinion P2 that is externally meshed with the second sun gear S2, and a second ring gear R2 that is internally meshed with the second pinion P2 respectively as fourth, fifth, and sixth rotation elements N4, N5, and N6.

The third planetary gear set PG3 is a single pinion planetary gear set and includes a third sun gear S3, a third planet carrier PC3 rotatably supporting a third pinion P3 that is externally meshed with the third sun gear S3, and a third ring gear R3 that is internally meshed with the third pinion P3 respectively as seventh, eighth, and ninth rotation elements N7, N8, and N9.

The fourth planetary gear set PG4 is a single pinion planetary gear set and includes a fourth sun gear S4, a fourth planet carrier PC4 rotatably supporting a fourth pinion P4 that is externally meshed with the fourth sun gear S4, and a fourth ring gear R4 that is internally meshed with the fourth pinion P4 respectively as tenth, eleventh, and twelfth rotation elements N10, N11, and N12.

In the first, second, third, and fourth planetary gear sets PG1, PG2, PG3, and PG4, the first rotation element N1 is directly connected to the fifth rotation element N5, the third rotation element N3 is directly connected to the ninth rotation element N9, and the sixth rotation element N6 is directly connected to the seventh rotation element N7 and the tenth rotation element N10, such that the first, second, third, and fourth planetary gear sets PG1, PG2, PG3, and PG4 are operated while having a total of eight shafts TM1 to TM8.

The eight shafts TM1 to TM8 will be described in further detail.

The eight shafts TM1 to TM8 directly connect a plurality of rotation elements among the rotation elements of the planetary gear sets PG1, PG2, PG3, and PG4, are rotation members that are each directly connected to at least one rotation element of the planetary gear sets PG1, PG2, PG3, and PG4 and rotate with the at least one rotation element to transmit torque, or are fixed members that directly connect at least one rotation element of the planetary gear sets PG1, PG2, PG3, and PG4 to the transmission housing H to fix the at least one rotation element.

The first shaft TM1 directly connects the first rotation element N1 (first sun gear S1) and the fifth rotation element N5 (second planet carrier PC2) and is directly connected with the input shaft IS so as to continuously be operated as an input element.

The second shaft TM2 is connected with the second rotation element N2 (first planet carrier PC1).

The third shaft TM3 directly connects the third rotation element N3 (first ring gear R1 and the ninth rotation element N9 (third ring gear R3).

The fourth shaft TM4 is connected with the fourth rotation element N4 (second sun gear S2) and selectively connectable with the transmission housing H, thereby selectively acting as a fixed element.

The fifth shaft TM5 is connected with the eighth rotation element N8 (third planet carrier PC3), and selectively connectable with the first shaft TM1 and the second shaft TM2 respectively.

The sixth shaft TM6 is connected with the eleventh rotation element N11 (fourth planet carrier PC4), selectively connectable with the third shaft TM3, and directly connected with the output shaft OS so as to be continuously operated as an output element.

The seventh shaft TM7 is connected with the twelfth rotation element N12 (fourth ring gear R4), selectively connectable with the second shaft TM2, and selectively connectable with the transmission housing H, thereby selectively acting as a fixed element.

The eighth shaft TM8 directly connects the sixth rotation element N6 (second ring gear R2), the seventh rotation element N7 (third sun gear S3), and the tenth rotation element N10 (fourth sun gear S4).

In addition, four clutches C1, C2, C3, and C4 are disposed at positions at which at least two shafts among the eight shafts TM1 to TM8 including the input shaft IS and the output shaft OS are selectively connectable to each other.

In addition, two brakes B1 and B2 are disposed at positions at which at least one shaft among the eight shafts TM1 to TM8 is selectively connectable to the transmission housing H.

Arrangements of the four clutches C1 to C4 and the two brakes B1 to B2 are described in detail.

The first clutch C1 is disposed between the first shaft TM1 and the fifth shaft TM5 and selectively connects the first shaft TM1 and the fifth shaft TM5.

The second clutch C2 is disposed between the third shaft TM3 and the sixth shaft TM6 and selectively connects the third shaft TM3 and the sixth shaft TM6.

The third clutch C3 is disposed between the second shaft TM2 and the seventh shaft TM7 and selectively connects the second shaft TM2 and the seventh shaft TM7.

The fourth clutch C4 is disposed between the second shaft TM2 and the fifth shaft TM5 and selectively connects the second shaft TM2 and the fifth shaft TM5.

The first brake B1 is disposed between the seventh shaft TM7 and the transmission housing H and selectively connects the seventh shaft TM7 with the transmission housing H.

The second brake B2 is disposed between the fourth shaft TM4 and the transmission housing H and selectively connects the fourth shaft TM4 with the transmission housing H.

Referring to FIG. 3, although the first clutch C1 is selectively connects the first shaft TM1 and the fifth shaft TM5, the first shaft TM1 is continuously directly connected with the input shaft IS such that the first clutch C1 connects the input shaft IS and the fifth shaft TM5, and the fifth shaft TM5 is operated as input element.

The control elements including the first, second, third, and fourth clutches C1, C2, C3, and C4 and the first and second brake B1 and B2 may be multi-plates friction elements of wet type that are operated by hydraulic pressure.

Figure 4:
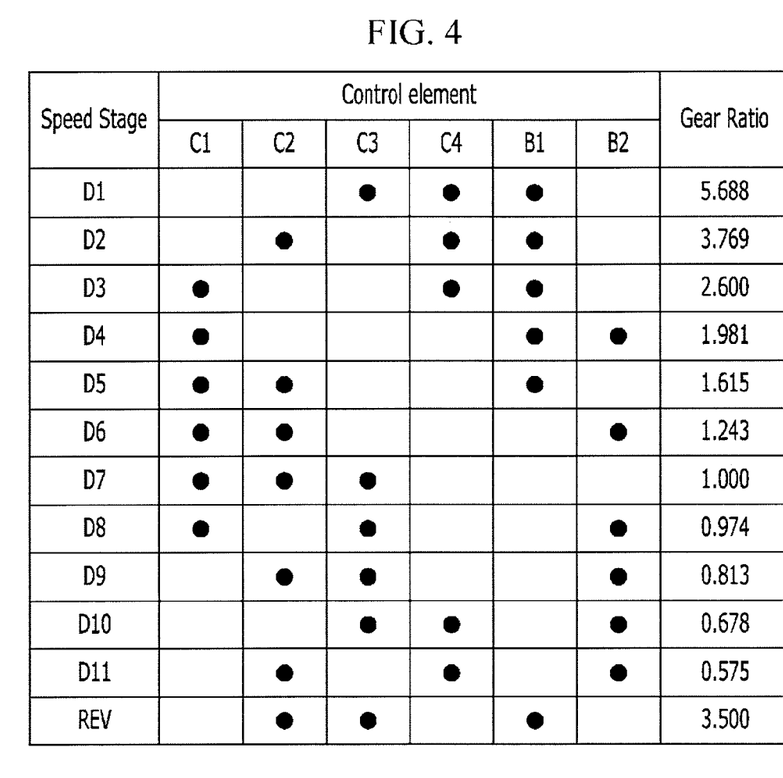
FIG. 4 is an operational chart for respective friction elements at respective shift-stages in the planetary gear train of FIG. 3, according various embodiments of the present invention.

FIG. 4 is an operational chart for respective friction elements at respective shift-stages in a planetary gear train according to the second exemplary embodiment of the present invention.

Referring to FIG. 4, three control elements among the first, second, third, and fourth clutches C1, C2, C3, and C4 and the first and second brakes B1 and B2 that are control elements are operated at each speed stage in the planetary gear train according to the second exemplary embodiment of the present invention. The second exemplary embodiment of the present invention can achieve one reverse speed stage and eleven forward speed stages.

The third and fourth clutches C3 and C4 and first brake B1 are operated at a first forward speed stage D1.

In a state that the second shaft TM2 is connected to the seventh shaft TM7 by the operation of the third clutch C3 and the second shaft TM2 is connected to the fifth shaft TM5 by the operation of the fourth clutch C4, torque of the input shaft IS is input to the first shaft TM1. In addition, the seventh shaft TM7 is operated as the fixed elements by the operation of the first brake B1. Therefore, the torque of the input shaft IS is shifted into the first forward speed stage, and the first forward speed stage is output to the output shaft OS connected to the sixth shaft TM6.

The second and fourth clutches C2 and C4 and first brake B1 are operated at a second forward speed stage D2.

In a state that the third shaft TM3 is connected to the sixth shaft TM6 by the operation of the second clutch C2 and the second shaft TM2 is connected to the fifth shaft TM5 by the operation of the fourth clutch C4, the torque of the input shaft IS is input to the first shaft TM1. In addition, the seventh shaft TM7 is operated as the fixed elements by the operation of the first brake B1. Therefore, the torque of the input shaft IS is shifted into the second forward speed stage, and the second forward speed stage is output to the output shaft OS connected to the sixth shaft TM6.

The first and fourth clutches C1 and C4 and first brake B1 are operated at a third forward speed stage D3.

In a state that the first shaft TM1 is connected to the fifth shaft TM5 by the operation of the first clutch C1 and the second shaft TM2 is connected to the fifth shaft TM5 by the operation of the fourth clutch C4, the torque of the input shaft IS is input to the first shaft TM1 and the fifth shaft TM5. In addition, the seventh shaft TM7 is operated as the fixed elements by the operation of the first brake B1. Therefore, the torque of the input shaft IS is shifted into the third forward speed stage, and the third forward speed stage is output to the output shaft OS connected to the sixth shaft TM6.

The first clutch C1 and first and second brakes B1 and B2 are operated at a fourth forward speed stage D4.

In a state that the first shaft TM1 is connected to the fifth shaft TM5 by the operation of the first clutch C1, the torque of the input shaft IS is input to the first shaft TM1 and the fifth shaft TM5. In addition, the seventh shaft TM7 and the fourth shaft TM4 is operated as the fixed elements by the operation of the first and brakes B1 and B2. Therefore, the torque of the input shaft IS is shifted into the fourth forward speed stage, and the fourth forward speed stage is output to the output shaft OS connected to the sixth shaft TM6.

The first and second clutches C1 and C2 and first brake B1 are operated at a fifth forward speed stage D5.

In a state that the first shaft TM1 is connected to the fifth shaft TM5 by the operation of the first clutch C1 and the third shaft TM3 is connected to the sixth shaft TM6 by the operation of the second clutch C2, the torque of the input shaft IS is input to the first shaft TM1 and the fifth shaft TM5. In addition, the seventh shaft TM7 is operated as the fixed elements by the operation of the first brake B1. Therefore, the torque of the input shaft IS is shifted into the fifth forward speed stage, and the fifth forward speed stage is output to the output shaft OS connected to the sixth shaft TM6.

The first and second clutches C1 and C2 and second brake B2 are operated at a sixth forward speed stage D6.

In a state that the first shaft TM1 is connected to the fifth shaft TM5 by the operation of the first clutch C1 and the third shaft TM3 is connected to the sixth shaft TM6 by the operation of the second clutch C2, the torque of the input shaft IS is input to the first shaft TM1 and the fifth shaft TM5. In addition, the fourth shaft TM4 is operated as the fixed elements by the operation of the brake B2. Therefore, the torque of the input shaft IS is shifted into the sixth forward speed stage, and the sixth forward speed stage is output to the output shaft OS connected to the sixth shaft TM6.

The first, second, and third clutches C1, C2, and C3 are operated at a seventh forward speed stage D7.

In a state that the first shaft TM1 is connected to the fifth shaft TM5 by the operation of the first clutch C1, the third shaft TM3 is connected to the sixth shaft TM6 by the operation of the second clutch C2, and the second shaft TM2 is connected to the seventh shaft TM7 by the operation of the third clutch C3, entire planetary gear sets PG1, PG2, PG3, and PG4 integrally rotate. In addition, a torque inputted through the first shaft TM1 and fifth shaft TM5 is outputted as inputted, thereby forming the seventh forward speed and outputting the inputted torque to the output shaft OS connected with the sixth shaft TM6.

The first and third clutches C1 and C3 and second brake B2 are operated at an eighth forward speed stage D8.

In a state that the first shaft TM1 is connected to the fifth shaft TM5 by the operation of the first clutch C1 and the second shaft TM2 is connected to the seventh shaft TM7 by the operation of the third clutch C3, the torque of the input shaft IS is input to the first shaft TM1 and the fifth shaft TM5. In addition, the fourth shaft TM4 is operated as the fixed elements by the operation of the brake B2. Therefore, the torque of the input shaft IS is shifted into the eighth forward speed stage, and the eighth forward speed stage is output to the output shaft OS connected to the sixth shaft TM6.

The second and third clutches C2 and C3 and second brake B2 are operated at a ninth forward speed stage D9.

In a state that the third shaft TM3 is connected to the sixth shaft TM6 by the operation of the second clutch C2 and the second shaft TM2 is connected to the seventh shaft TM7 by the operation of the third clutch C3, the torque of the input shaft IS is input to the first shaft TM1. In addition, the fourth shaft TM4 is operated as the fixed elements by the operation of the brake B2. Therefore, the torque of the input shaft IS is shifted into the ninth forward speed stage, and the ninth forward speed stage is output to the output shaft OS connected to the sixth shaft TM6.

The third and fourth clutches C3 and C4 and second brake B2 are operated at a tenth forward speed stage D10.

In a state that the second shaft TM2 is connected to the seventh shaft TM7 by the operation of the third clutch C3 and the second shaft TM2 is connected to the fifth shaft TM5 by the operation of the fourth clutch C4, the torque of the input shaft IS is input to the first shaft TM1. In addition, the fourth shaft TM4 is operated as the fixed elements by the operation of the brake B2. Therefore, the torque of the input shaft IS is shifted into the tenth forward speed stage, and the tenth forward speed stage is output to the output shaft OS connected to the sixth shaft TM6.

The second and fourth clutches C2 and C4 and second brake B2 are operated at an eleven forward speed stage D11.

In a state that the third shaft TM3 is connected to the sixth shaft TM6 by the operation of the second clutch C2 and the second shaft TM2 is connected to the fifth shaft TM5 by the operation of the fourth clutch C4, the torque of the input shaft IS is input to the first shaft TM1. In addition, the fourth shaft TM4 is operated as the fixed elements by the operation of the brake B2. Therefore, the torque of the input shaft IS is shifted into the eleven forward speed stage, and the eleven forward speed stage is output to the output shaft OS connected to the sixth shaft TM6.

The second and third clutches C2 and C3 and first brake B1 are operated at a reverse speed stage REV.

In a state that the third shaft TM3 is connected to the sixth shaft TM6 by the operation of the second clutch C2 and the second shaft TM2 is connected to the seventh shaft TM7 by the operation of the third clutch C3, the torque of the input shaft IS is input to the first shaft TM1. In addition, the seventh shaft TM7 is operated as the fixed elements by the operation of the first brake B1. Therefore, the torque of the input shaft IS is shifted into the reverse speed stage, and the reverse speed stage is output to the output shaft OS connected to the sixth shaft TM6.

The planetary gear train according to various embodiments of the present invention achieves at least eleven forward speed stages and one reverse speed stage by combining four planetary gear sets PG1, PG2, PG3, and PG4 with the six control elements.

In addition, a planetary gear train according to various embodiments of the present invention realizes shift stages appropriate for rotation speed of an engine due to multiple speed-stages of an automatic transmission and improves driving stability of a vehicle by utilizing a low rotation speed of an engine.

Furthermore, a planetary gear train according to various embodiments of the present invention maximizes engine driving efficiency by multiple speed-stages of an automatic transmission, and improves power delivery performance and fuel consumption.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle comprising:
   an input shaft receiving torque of an engine;
   an output shaft outputting torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element;
   a fourth planetary gear set including a tenth rotation element, an eleventh rotation element, and a twelfth rotation element;
   a first shaft connecting the first rotation element and the fifth rotation element and directly connected with the input shaft;
   a second shaft connected with the second rotation element;
   a third shaft connecting the third rotation element and ninth rotation element;
   a fourth shaft connected with the fourth rotation element;
   a fifth shaft connected with the eighth rotation element and selectively connectable with each of the first shaft and the second shaft;
   a sixth shaft connected with the eleventh rotation element, selectively connectable with the third shaft, and directly connected with the output shaft; and
   a seventh shaft connected with the twelfth rotation element and selectively connectable with the second shaft.

2. The planetary gear train of claim 1, wherein
   the first rotation element, the second rotation element, and the third rotation element comprise a first sun gear, a first planet carrier, and a first ring gear;
   the fourth rotation element, the fifth rotation element, and the sixth rotation element comprise a second sun gear, a second planet carrier, and a second ring gear;
   the seventh rotation element, the eighth rotation element, and the ninth rotation element comprise a third sun gear, a third planet carrier, and a third ring gear; and
   the tenth rotation element, the eleventh rotation element, and the twelfth rotation element comprise a fourth sun gear, a fourth planet carrier, and a fourth ring gear.

3. The planetary gear train of claim 1, wherein
   the fourth shaft is directly connected with a transmission housing;
   the seventh shaft is selectively connectable with the transmission housing; and
   the planetary gear train further includes:
   an eighth shaft connected with the sixth rotation element; and
   a ninth shaft connecting the seventh rotation element and the tenth rotation element and selectively connectable with the eighth shaft.

4. The planetary gear train of claim 3, further comprising:
   a first clutch selectively connecting the first shaft and fifth shaft;
   a second clutch selectively connecting the third shaft and the sixth shaft;
   a third clutch selectively connecting the second shaft and the seventh shaft;
   a fourth clutch selectively connecting the second shaft and the fifth shaft;
   a fifth clutch selectively connecting the eighth shaft and the ninth shaft; and
   a first brake selectively connecting the seventh shaft and the transmission housing.

5. The planetary gear train of claim 1, wherein
   the fourth shaft and the seventh shaft are each selectively connectable with a transmission housing; and
   the planetary gear train further includes an eighth shaft connecting the sixth rotation element, the seventh rotation element, and the tenth rotation element.

6. The planetary gear train of claim 5, further comprising:
   a first clutch selectively connecting the first shaft and fifth shaft;
   a second clutch selectively connecting the third shaft and the sixth shaft;
   a third clutch selectively connecting the second shaft and the seventh shaft;
   a fourth clutch selectively connecting the second shaft and the fifth shaft;
   a first brake selectively connecting the seventh shaft and the transmission housing; and
   a second brake selectively connecting the fourth shaft and the transmission housing.

7. A planetary gear train of an automatic transmission for a vehicle comprising:
   an input shaft receiving torque of an engine;
   an output shaft outputting torque;
   a first planetary gear set including a first rotation element, a second rotation element, and a third rotation element;
   a second planetary gear set including a fourth rotation element, a fifth rotation element, and a sixth rotation element;
   a third planetary gear set including a seventh rotation element, an eighth rotation element, and a ninth rotation element; and
   a fourth planetary gear set including a tenth rotation element, an eleventh rotation element, and a twelfth rotation element,
   wherein the input shaft is directly connected with the fifth rotation element,
   the output shaft is directly connected with the eleventh rotation element,
   the first rotation element is directly connected with the fifth rotation element,
   the third rotation element is directly connected with the ninth rotation element,
   the fourth rotation element is directly connected with a transmission housing,
   the seventh rotation element is directly connected with the tenth rotation element and selectively connectable with the sixth rotation element,
   the eighth rotation element is selectively connectable with each of the second rotation element and the fifth rotation element,
   the eleventh rotation element is selectively connectable with the ninth rotation element, and
   the twelfth rotation element is selectively connectable with the second rotation element.

8. The planetary gear train of claim 7, wherein
   the first rotation element, the second rotation element, and the third rotation element comprise a first sun gear, a first planet carrier, and a first ring gear;
   the fourth rotation element, the fifth rotation element, and the sixth rotation element comprise a second sun gear, a second planet carrier, and a second ring gear;

the seventh rotation element, the eighth rotation element, and the ninth rotation element comprise a third sun gear, a third planet carrier, and a third ring gear; and the tenth rotation element, the eleventh rotation element, and the twelfth rotation element comprise a fourth sun gear, a fourth planet carrier, and a fourth ring gear.

9. The planetary gear train of claim 7, wherein the twelfth rotation element is selectively connectable with the transmission housing.

10. The planetary gear train of claim 9, further comprising:
a first clutch selectively connecting the fifth rotation element and the eighth rotation element;
a second clutch selectively connecting the ninth rotation element and the eleventh rotation element;
a third clutch selectively connecting the second rotation element and the twelfth rotation element;
a fourth clutch selectively connecting the second rotation element and the eighth rotation element;
a fifth clutch selectively connecting the sixth rotation element and the seventh rotation element; and
a first brake selectively connecting the twelfth rotation element and the transmission housing.

11. A planetary gear train of an automatic transmission for a vehicle comprising:
an input shaft receiving torque of an engine;
an output shaft outputting torque;
a first planetary gear set including a first rotation element, a second rotation element, and a third rotation element;
a second planetary gear set including a fourth rotation element, a fifth rotation element, and a sixth rotation element;
a third planetary gear set including a seventh rotation element, an eighth rotation element, and a ninth rotation element; and
a fourth planetary gear set including a tenth rotation element, an eleventh rotation element, and a twelfth rotation element,
wherein the input shaft is directly connected with the fifth rotation element,
the output shaft is directly connected with the eleventh rotation element,
the first rotation element is directly connected with the fifth rotation element,
the third rotation element is directly connected with the ninth rotation element,
the sixth rotation element is directly connected with the seventh rotation element and the tenth rotation element,
the eighth rotation element is selectively connectable with each of the second rotation element and the fifth rotation element,
the eleventh rotation element is selectively connectable with the ninth rotation element, and
the twelfth rotation element is selectively connectable with the second rotation element.

12. The planetary gear train of claim 11, wherein
the first rotation element, the second rotation element, and the third rotation element comprise a first sun gear, a first planet carrier, and a first ring gear;
the fourth rotation element, the fifth rotation element, and the sixth rotation element comprise a second sun gear, a second planet carrier, and a second ring gear;
the seventh rotation element, the eighth rotation element, and the ninth rotation element comprise a third sun gear, a third planet carrier, and a third ring gear; and
the tenth rotation element, the eleventh rotation element, and the twelfth rotation element comprise a fourth sun gear, a fourth planet carrier, and a fourth ring gear.

13. The planetary gear train of claim 11, wherein the fourth rotation element and the twelfth rotation element are each selectively connectable with a transmission housing.

14. The planetary gear train of claim 13, further comprising:
a first clutch selectively connecting the fifth rotation element and the eighth rotation element;
a second clutch selectively connecting the ninth rotation element and the eleventh rotation element;
a third clutch selectively connecting the second rotation element and the twelfth rotation element;
a fourth clutch selectively connecting the second rotation element and the eighth rotation element;
a first brake selectively connecting the twelfth rotation element and the transmission housing; and
a second brake selectively connecting the fourth rotation element and the transmission housing.

\* \* \* \* \*